May 26, 1959
M. A. HARRISON ET AL
2,888,175
ROTARY SEAR VALVE
Filed Feb. 26, 1957
3 Sheets-Sheet 1
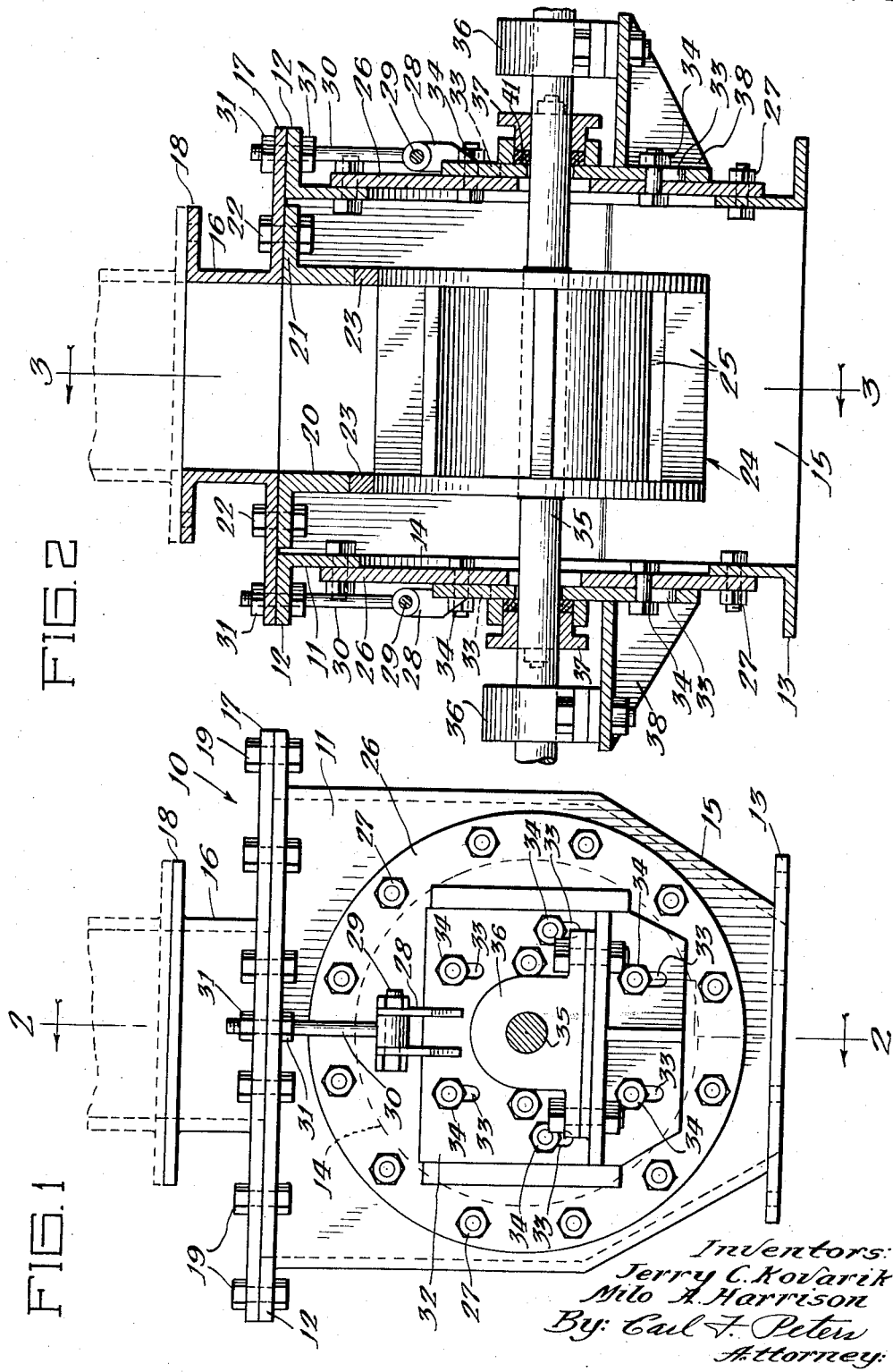
Inventors:
Jerry C. Kovarik
Milo A. Harrison
By: Carl F. Peter
Attorney May 26, 1959

M. A. HARRISON ET AL 2,888,175

ROTARY SEAR VALVE

Filed Feb. 26, 1957

Inventors:
Jerry C. Kovarik
Milo A. Harrison
By: Carl F. Peters
Attorney.

May 26, 1959  M. A. HARRISON ET AL  2,888,175
ROTARY SEAR VALVE
Filed Feb. 26, 1957  3 Sheets-Sheet 3
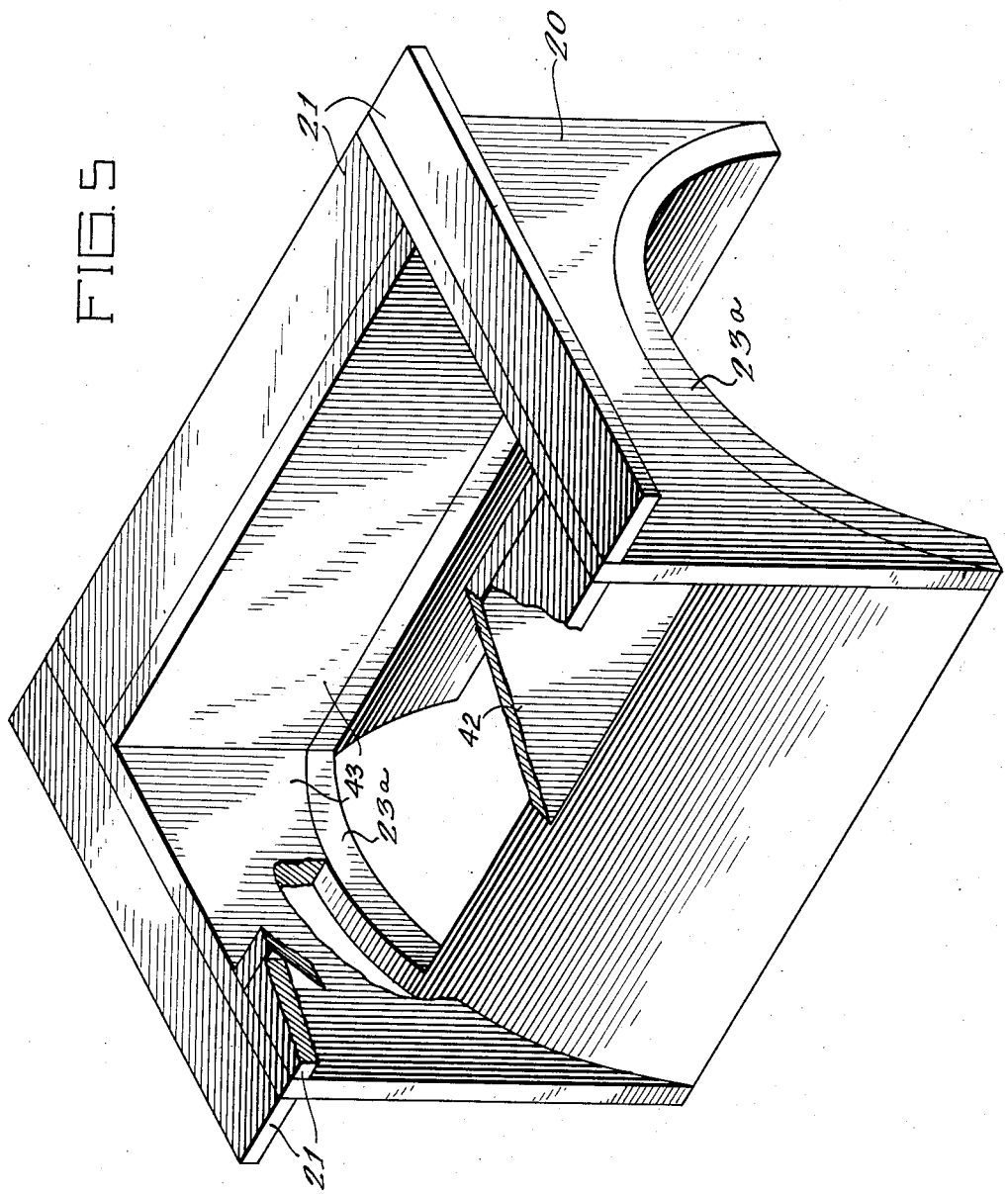
Inventors:
Jerry C. Kovarik
Milo A. Harrison
By: Carl F. Peters
Attorney

United States Patent Office 2,888,175
Patented May 26, 1959

2,888,175

ROTARY SEAL VALVE

Milo A. Harrison and Jerry C. Kovarik, Redondo Beach, Calif., assignors to Great Lakes Carbon Corporation, New York, N.Y., a corporation of Delaware Application February 26, 1957, Serial No. 642,396

5 Claims. (Cl. 222—368)

This invention relates to rotary valves designed to control the transfer of finely divided solids from a hopper or other container. The invention is particularly directed to rotary valves designed to accomplish the aforementioned purpose while effecting a pneumatic seal on opposite sides of the rotor.

Rotary valves which have heretofore been used for the removal or transfer of finely divided solids from bins, hoppers and the like usually comprise a plate which depends from the hopper and a rotor which initially engages the lower surface of the plate. As the rotor turns, the compartmental sections or segments of the rotor, formed by vanes or blades protruding from a hub, pick up material from the hopper and transfer it to the other side of the rotor. One difficulty with such devices has been the abrasion or wear incident to its operation in the transfer of abrasive solid materials. The peripheral surfaces of the valve or the opposed sealing surfaces of the plate become abraded and worn. This results in non-uniform transfer of solids, but what is even more important prevents the maintaining of an effective pneumatic seal in the event that the hopper or bins on opposite sides of the valve are operating at a pressure differential. Furthermore, the wear of the valve results in frequent breakdown and replacement. It will also be appreciated that the extent of leakage of solids and gases past the valve will increase with any increase in gas pressure differential.

It has been proposed to overcome these difficulties by means of wearing surfaces or shoes, positioned in a valve housing, which are adjustable to compensate for the wear encountered during normal operations. Such devices are characterized by the use of a seal or gasket, usually of plastic, deformable material which bears against the upper edge of the shoes. This gasket or packing material is often subject to temperature conditions which exist inside the rotary valve which may occasionally be as high as 600° F. This results in either deterioration of the gasket or abnormal and uneven compression with resultant poor contact of the shoes with the rotor. Such devices are also characterized by extremely short bearing surfaces for the shoes. This feature, with the arrangement of supporting bolts normally used causes jamming of the shoe during operation. Therefore, it has been found that such units cannot be adjusted during operation. In addition, in such devices the shoes or sealing members cover only the top 120° angle of the rotor whereas it is desirable to form the seal over 180° of the rotor.

It has also been proposed to combat the aforementioned difficulties by means of a "floating shoe" which rides on top of the rotor by the force of gravity. In the event that the material being transferred is abrasive in character, the material will get between the metal of the rotor blades and the metal of the floating shoe and both parts will wear out fairly rapidly. In addition, the rotor in its normal turning tends to twist the floating shoe in the direction of rotation. If a packing material is used to prevent this movement the shoe will fail to move and in a short while begins to wear due to the ever widening gaps between the rotor and the shoe, this condition being aggravated by the high velocity of particles carried between the parts by leaking air. Furthermore, such packing is subjected to deterioration by the interior temperatures of the valve which, as stated above, can run as high as 600° F.

It is an object of this invention to provide a rotary seal valve which will effectively separate solid material from a hopper, chamber, etc. while preventing or minimizing flow of air either up or down through the seal valve.

It is a further object of this invention to provide a rotary seal valve which is subject to a minimum amount of abrasion and deterioration in normal operation.

It is a further object of this invention to provide a rotary seal valve which is particularly adapted to high temperature operations and which does not require the use of a packing material inside of the valve housing.

It is a further object of this invention to provide a rotary seal valve which is capable of close adjustment under operating conditions, even when such conditions include relatively high temperatures and high negative or positive air pressures.

It is a further object of this invention to provide a rotary seal valve in which the sealing shoes remain stationary and the rotor is adjustable during normal operations.

It is a further object of the invention to provide a rotary seal valve in which a minimum clearance can be secured between the rotor and the sealing shoe and the sealing arc is 180°.

Other objects and advantages will appear in the following specification, reference being had to the accompanying drawings in which:

Figure 1 is an end elevational view of a rotary valve embodying the invention;

Figure 2 is a section taken along the line 2—2 of Figure 1;

Figure 5 is a perspective view of a preferred embodiment of the sealing shoe which is an essential part of the invention.

Generally speaking, the device of the present invention comprises a valve housing, a cylindrical compartmented rotary valve, means for sealing the valve at all times comprising a sealing shoe positioned within the housing having an under surface conforming with the end surfaces of the rotor blades and being longer circumferentially of the rotor than the peripheral distance between adjacent rotor blades, and means exterior of the housing to adjust the rotor relative to the shoe while maintaining a substantially gas-tight seal not only during operation of the valve but during the adjustment of the valve rotor relative to the shoe.

Figure 3:
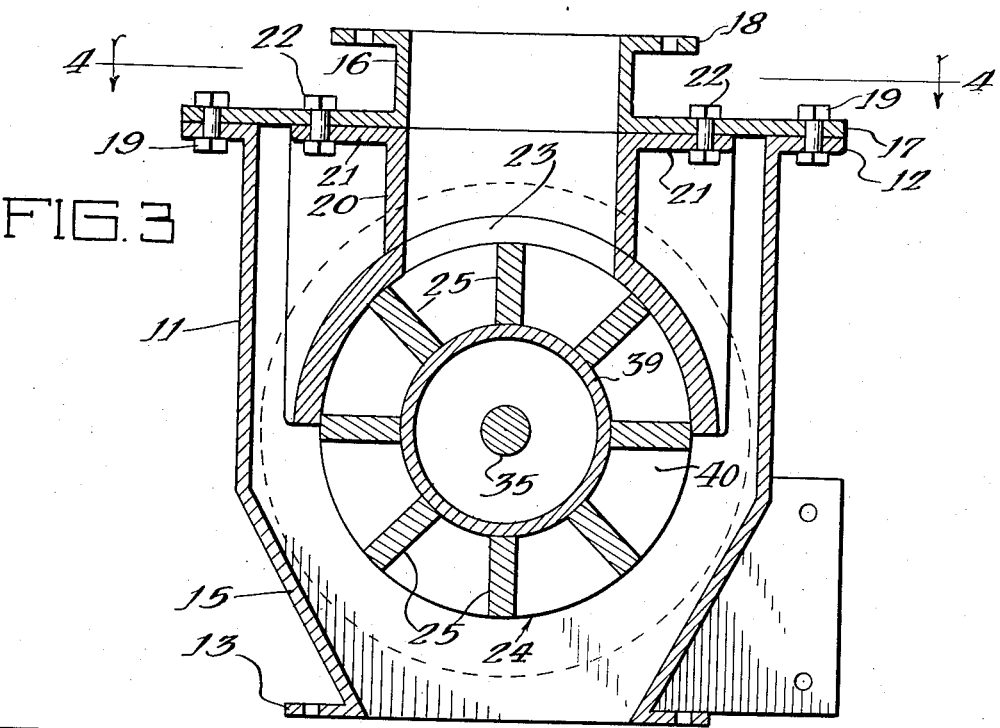
Figure 3 is a vertical section taken on line 3—3 of Figure 2.
Figure 4:
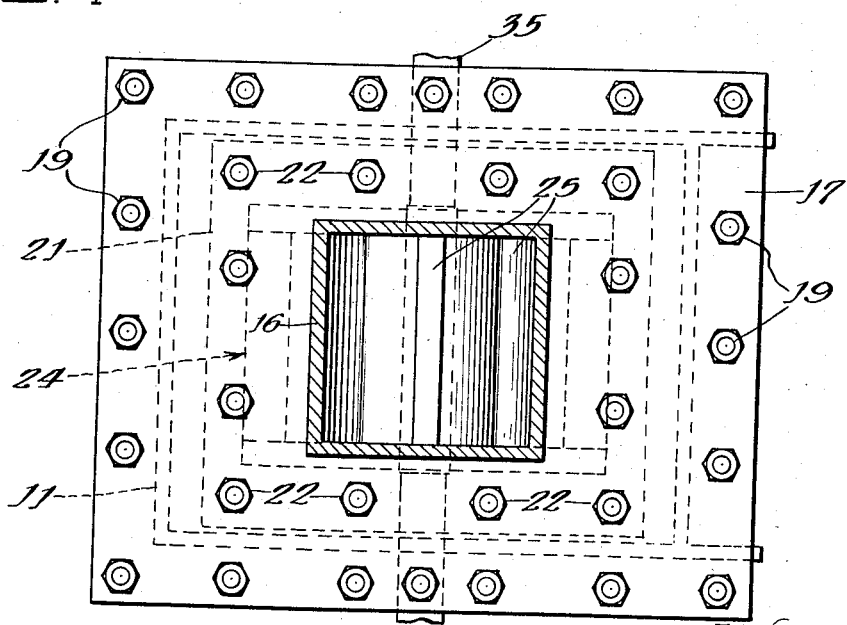
Figure 4 is a plan section taken on the line 4—4 of Figure 3.

Referring now to the drawings, particularly Figs. 2, 3, and 4, the invention comprises a rotary seal valve shown generally at 10 consisting of a housing having two oppositely disposed side walls 11 whose lower section 15 is tapered inwardly, the upper and lower portions of the housing walls 11 terminating with flanged members 12 and 13, respectively.

Superimposed on the housing is upper member 16, having flanged sections 17—18, which forms the upper portion of the valve housing and which connects the housing to a hopper, bin, etc. The flanged sections 17—18 are secured to the flanges 12 of the housing by means of bolts 19. Positioned within the upper portion of the housing and fixed and secured by means of bolts 22 to flange 17 is a sealing shoe 20. The lower portion of the sealing shoe 20 is of arcuate shape, the under surface 23a conforming with the end surfaces of the blades or vanes 25 of the rotor 24.

The rotor, shown generally at 24, consists of a hub 39 from which radiate vanes or blades 25, the end surfaces of said blades conforming with the under surfaces 23a of the arcuate shaped portion of the sealing shoe 20. The rotor also has end discs 23 between which the radial vanes or blades 25 extend, thereby forming a plurality of compartments 40. The rotor is positioned and suspended in the housing and rotated by an axial hub shaft 35 which traverses an annular opening or aperture in the wall plate 26 of the housing and also a relatively smaller aperture in a plate 32 which is slidably mounted on the outside of the wall plate 26. The shaft 35 is secured exterior of the housing 11 and the slidable plates 32 by means such as self-aligning bearings 36 (details not shown), said bearings being mounted on a supporting bracket 38 which in turn is affixed to the slidable plates 32 by means of bolts or by welding as an integral part of the slidable plate.

The slidable plate 32 and the shaft-rotor assembly are adjustable vertically relative to the sealing shoe 20 by means of apertures, preferably in the form of slots 33 which are stamped or drilled into the plates, said slots registering with members secured to and protruding from the outside surfaces of the housing plates 26, preferably in the form of threaded studs 34.

Attached to the slidable plate 32 are means connecting said plate to the upper flange portion 12 of the housing 11. In Figure 1, this means takes the form of lugs 28 which are an integral part of the plate, the lugs registering with and receiving eyes 29 on the end of an eyebolt 30, the threaded end of the eyebolt traversing a drilled hole in upper housing flange members 12 and 17 and being secured there by correspondingly threaded nuts 31. The plates 32 slide on the exterior surface of housing plates 26, shown in the drawings to be circular in figuration. The plate 26 is secured to the housing wall 11 by means of bolts 27. It is to be understood, of course, that the end plates 26 need not be of circular configuration and other shapes are within the scope of the invention.

Air leakage into the housing 11 is prevented at the point where the shaft 35 traverses the aperture of slidable plates 32 by the provision of the packing 41 which seats against the exterior surface of slidable plate 32 and which is maintained in place by means of packing rings 37 secured in position on shaft 35 by any suitable means.

Referring now to Figure 5 there is shown a preferred embodiment of the sealing shoe which consists of a welded integral unit. This shoe is indicated generally at 20 and consists of an arcuate shaped member, preferably constructed of steel, whose undersurface 23a will conform with the end surfaces of the rotor vanes 25. In the upper portion of the arcuate shaped shoe is an opening through which the finely divided product, which passes from a product bin or hopper, will drop into the compartmentalized rotor 24. The shoe is equipped with end surfaces 43 and vertical bracing members 42. The supporting flanges are indicated at 21.

While Figure 5 illustrates a preferred embodiment of the sealing shoe which is integral part of our invention it is to be understood that this shoe may be constructed of more than one piece or section. For example, the shoe can be split on either the transverse or longitudinal axis if desired for fabrication purposes and the pieces bolted together in a conventional manner.

In operation, the clearance between the vanes or blades 25 of the rotor 24 and the under surfaces of the arcuate section of the sealing shoe 20 can be maintained to a tolerance of between 1 to $2/1000$ of an inch by loosening the slidable plates 32 which also carry the packing 41, sealing rings 37 and bearings 36, and then tightening up the eyebolts 30 which will raise the rotor 24 in slight contact with the shoe 20. It will be appreciated that this adjustment may be made while the rotary seal valve assembly is in operation by merely loosening bolts 34 which permit the slidable plates 32 to move while in direct contact with the surface of plates 11. When the proper adjustment has been made the eyebolts are secured by nuts 31 and the slidable plates 32 are fixed in the adjusted position by means of bolts 34.

The present invention prevents leakage of air into interior portion of the seal valve. Also, it is possible to adjust the unit so that the clearance between the rotor blades and the under surface of the shoe is so close that no solid material is permitted to pass thereby greatly adding to the useful life of the seal valve.

It is to be understood that the foregoing description and the attached drawings merely illustrate a preferred embodiment of the invention and that equivalent means can be employed for the various mechanical features herein illustrated. For example, means equivalent to the eye bolts 30 (such as toggle bolts) and plate lugs 28 can be used to elevate and adjust the slidable plates 32. Similarly other equivalent means can be used in place of the threaded studs and bolts 34 which register with slots 33 of the slidable plate 32. It is also within the scope of the invention to use single piece end plates, carrying appropriate studs or equivalent means, in place of the combination of the flanged wall members 11 and plate 26, assuming, of course, that such single units have centrally located apertures which will give adequate clearance to the axial hub shaft 35 as it is adjusted upwardly to permit the end surfaces of the rotor blades 25 to conform with and closely fit the under surface of the sealing shoe fuse 20.

It being understood that other modifications of our invention are within the spirit thereof, and not being limited to the specific embodiment illustrated herein, we claim:

1. An apparatus for controlling the transfer of finely divided solids comprising: a housing having annular openings, a cylindrical rotor within said housing including a hub, end discs spaced axially apart on said hub and a plurality of blades connecting said discs and extending outwardly from the hub to the outer periphery of said discs; a sealing shoe fixed within said housing between the rotor and the upper portion of said housing and whose under surface conforms with the end surfaces of said blades and being longer circumferentially of the rotor than the peripheral distance between adjacent blades; said rotor being positioned within said housing by means of axial hub shafts traversing the annular openings in said housing, members having apertures, said members being slidably positioned against the exterior wall of said housing, said shafts traversing said apertures, the apertures in said slidable members being smaller than said housing openings, means secured to said slidable members to support said shafts, and means to adjust said slidable members and the shaft-rotor asembly relative to said shoe while maintaining a substantially gas-tight seal.

2. Apparatus according to claim 1 wherein said adjusting means consists of eyebolts which connect said slidable members with the upper portion of said housing.

3. Apparatus according to claim 1 wherein said slidable members contain apertures registering with members protruding from the outside surface of said housing, said slidable members being adjustable to the extent of the dimension of said apertures and being secured against the housing wall to form a substantially gas-tight seal by means cooperating with said protruding members.

4. Apparatus according to claim 1 wherein said slidable members contain slots registering with threaded studs protruding from the outside surface of said housing, said slidable members being adjustable to the extent of the length of said slots and being secured against the exterior wall of said housing to form a substantially gas-tight seal by threaded means positioned on said studs.

5. Apparatus according to claim 1 wherein two opposite sides of the housing comprise upper and lower flange members, plates secured to said flanges containing centrally located, oppositely disposed holes larger than the shaft diameter to accommodate the shafts; threaded studs protruding from said plates; slots in the slidable plates registering with said studs and securable against the exterior side of said secured plates to form a substantially gas-tight seal by threaded means positioned on said studs, air-excluding sealing means around said shafts exterior of said slidable plates, bearings mountably secured to said slidable plates supporting said shafts, and eyebolts connecting said slidable plates with the upper portion of said housing.

References Cited in the file of this patent
UNITED STATES PATENTS

| | | |
|---|---|---|
| 2,428,241 | Pootjes | Sept. 30, 1947 |
| 2,538,320 | Mylting | Jan. 16, 1951 |
| 2,585,198 | Warren | Feb. 12, 1952 |